United States Patent

Seebald

[15] 3,680,504
[45] Aug. 1, 1972

[54] MULTI-PURPOSE UTILITY DEVICE

[72] Inventor: Francis W. Seebald, 18801 E. Shoreland Drive, Rocky River, Ohio 44116

[22] Filed: Oct. 27, 1969

[21] Appl. No.: 869,598

[52] U.S. Cl. ..................................................111/6
[51] Int. Cl. ..............................................A01c 23/02
[58] Field of Search ....................111/6–7.4, 89, 111/92–96, 1, 8; 47/1, 1.7

[56] References Cited

UNITED STATES PATENTS

| | | | |
|---|---|---|---|
| 1,979,541 | 11/1934 | Gunn | 111/7.1 |
| 2,530,886 | 11/1950 | Maisel | 111/8 X |
| 2,619,055 | 11/1952 | Abel et al. | 111/7.1 |
| 2,763,222 | 9/1956 | Herstedt | 111/7.3 |
| 2,987,018 | 6/1961 | Vath | 111/8 |
| 3,289,418 | 12/1966 | Edgerton | 111/7.3 |
| 3,299,842 | 1/1967 | Bingham | 111/7.2 |

*Primary Examiner*—Robert E. Bagwill
*Attorney*—Teare, Teare & Sammon

[57] ABSTRACT

A multi-purpose utility device portably mounted on a wheeled frame for movement along the ground including an agitator mechanism adapted for selective coacting engagement with the ground and a fluid and/or solids dispensing system for delivering fluid and/or solid treating materials onto the ground in proximity to the agitator mechanism for independent and/or simultaneous fluid processing, chemical treating or mechanically working deleterious materials disposed on the ground.

6 Claims, 4 Drawing Figures

PATENTED AUG 1 1972

3,680,504

INVENTOR.
FRANCIS W. SEEBALD
BY
Leare, Leare, & Sammon
ATTORNEYS

MULTI-PURPOSE UTILITY DEVICE

BACKGROUND OF THE INVENTION

This invention relates generally to tools that may be used on or about residential, commercial and/or industrial landscaped areas, such as yards, lawns or the like, and more particularly relates to a novel, multi-purpose tool device of a portable wheeled construction capable of performing widely different yet related functions in processing and treating deleterious materials on or about the landscaped area.

Heretofore, various types of single or dual purpose lawn, garden or agricultural implements have been provided for carrying out different work functions such as rolling, aerating and fertilizing soil. The difficulties attendant in such single purpose implements is self-evident in that each step requires the application of a different tool designed for a specific purpose. For example, one tool would be required for rolling the soil, another for aerating, etc. Moreover, such single purpose devices are not only expensive to produce and maintain, but require unnecessary duplication of parts.

While dual purpose devices have been provided for agricultural purposes, no one device has heretofore been provided for processing and treating deleterious materials, such as animal refuse, feces or the like, so as to achieve an effective disposal thereof. During recent years the problem has become more acute due to the increasing popularity of keeping domestic animals and pets of all types with the resultant contamination of the lawn or yard area. Then too, there has developed an increasing critical attitude on the part of home owners with respect to the condition of the lawn or yard areas. Thus, well maintained lawn or yard areas have become increasingly desirable.

SUMMARY OF THE INVENTION

A multi-purpose utility device comprising, a frame, wheel means rotatably mounted on said frame for movement of said device along the ground, agitator means mounted on said frame adapted for coacting engagement with the ground, and fluid dispensing means operably associated with said frame for delivering fluidized material onto the ground and in proximity to said impeller means. In one form, said fluid dispensing means includes an inlet means communicating with said frame adapted to be connected to a source of fluid pressure and, in another form, said fluid dispensing means includes a container communicating with said frame and adapted to hold chemical treating materials for selective delivery to said frame. In either form, said frame includes a generally hollow chamber, and said chamber having a plurality of apertures therein adapted for passage of fluidized materials in a jet stream relation therefrom.

From the foregoing description it will be seen that the present invention provides a multi-purpose utility tool device capable of providing a plurality of functions on, about and under the ground, such as for yards, lawns and the like. More particularly, the device combines functions of dissolving, neutralizing and mechanically treating deleterious materials, such as animal refuse, feces or the like, so as to provide an effective disposal of such materials. The device is constructed and arranged to provide a combination of controlled fluid and/or solid chemical and/or force reactions which conjunctively coact with the surface and/or subsurface of the ground for quick and efficient removal of such deleterious materials. More specifically, the device provides a new and novel multi-purpose tool device especially suited for independently and/or simultaneously fluid processing, chemical treating and mechanically working such deleterious materials for removal thereof from the surface of the ground.

The utility device of the invention is relatively inexpensive to produce and maintain and is of a compact, rugged construction which can be quickly and easily operated. In addition, the device not only effectively removes the deleterious material from the ground, but gives beneficial physical and/or chemical benefits to the soil.

DESCRIPTION OF THE PREFERRED EMBODIMENTS

Figure 1:
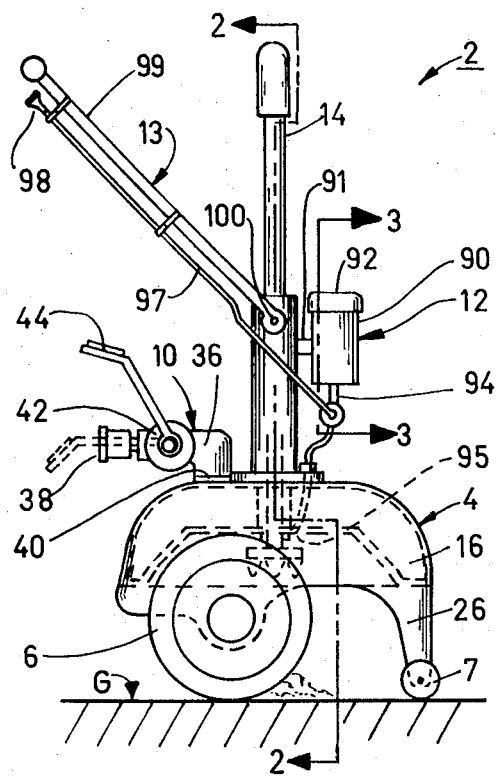
FIG. 1 is a side elevation view of the multi-purpose utility device made in accordance with the present invention.
Figure 2:
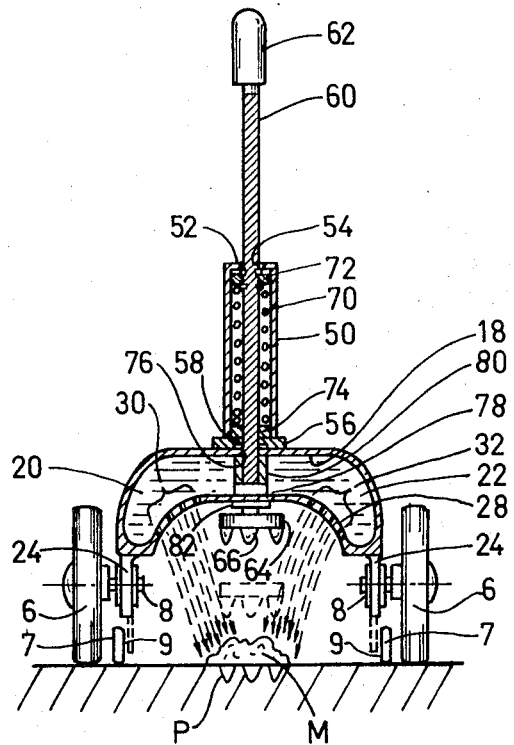
FIG. 2 is a generally vertical section view taken along the line 2—2 of FIG. 1.

Referring again to the drawings, and in particular to FIGS. 1 and 2 thereof, there is illustrated the multi-purpose utility device, designated generally at 2, of the invention for treating and processing the deleterious material M, such as animal refuse, feces or the like, disposed on the ground G. In general, the device 2 includes a portable frame 4 having a pair of wheels 6 and 7 on axles 8 and 9 for rolling movement along the ground. As shown, the frame 4 mounts a fluid distribution system 10 communicating with the frame 4, a dispensing mechanism 12 communicating with the frame 4 operated by a handle mechanism 13 and an agitator mechanism 14 disposed for coacting working engagement with the ground.

In the form shown, the frame 4 includes a generally hollow body 16 which defines a fluid receiving chamber (FIG. 2) for receiving a fluid material therein from the fluid distribution system 10. The chamber 18 is of a generally inverted U-shaped construction in transverse cross section and is defined by a pair of outwardly and downwardly smoothly curved wing-like sections 20 and 22 which provide a generally U-shaped construction defining a downwardly opening recess. in the area immediately below the body 16. The body 16 has a first pair of spaced oppositely disposed legs 24 depending downwardly therefrom which receive in journaled relation the wheels 6 via the axles 8. The body 16 includes a further pair of spaced, oppositely disposed legs 26 which receive in journaled relation the wheels 7 via axles 9. It will be seen that the legs 24 are foreshortened relative to the legs 26 with the diameter of the wheels 6 being substantially greater than the diameter of the wheels 7 so as to provide an optimum clearance area below the frame 4 to provide maximum processing and treating of the materials to be removed. In this connection, the curved under side 28 of the chamber 18 is provided with a pair 30 and 32 of longitudinally extending and laterally spaced rows of apertures which communicate the interior of the chamber 18 with the exterior thereof. By this arrangement, fluid materials in the chamber 18 may be forced under pressure through the rows of apertures 30 and 32 in the jet-like streams for impingement upon the deleterious material M. In the invention, it is preferred that the apertures 30 and 32 be angularly disposed relative to the longitudinal central axis of the device so as to be angularly impinged for processing and treating engagement with the material M, as best seen in FIG. 2. The frame 4 may be made of any suitable high strength corrosion resistant material such as cast aluminum, plastic or the like, as desired.

As best seen in FIG. 1, the fluid distribution system or mechanism 10 includes a generally L-shaped conduit 36 having an inlet end 38 and an outlet end 40. The inlet end 40 communicates in fluid transfer relation with the interior of the chamber 18 while the inlet end 38 is adapted to be coupled to a fluid supply source, such as a garden hose or the like. Fluid flow may be controlled through the conduit 36 via a suitable control valve 42 as known in the art. The valve 42, in turn, may be actuated by a foot lever or pedal 44 mechanically coupled to the valve 42 for controlling the flow of fluid under pressure from the inlet end 38 to the outlet end 36 and into the chamber 18. In the invention, the fluid supplied may be water provided from any suitable supply source, as desired.

In accordance with the invention, the agitator mechanism 14 for working engagement with the ground G, includes a generally cylindrical housing 50 mounted in upstanding generally vertically oriented relation on the frame 4. The housing 50 is closed at one end, as at 52, and includes an aperture 54. The other end of the housing 50 is mounted on a plate or ring 56 attached to the frame 4 which plate contains another aperture 58 in alignment with the aperture 54. An elongated drive or agitator rod or shaft 60 is disposed for reciprocal sliding movement through the housing 50 via apertures 54 and 58. The shaft 60 includes an actuating handle 62 at one end and an agitator member 64 at the other end. The agitator member 64 includes a plurality of generally sharpened or pointed tangs or fingers 66 adapted for coacting penetrating engagement within the ground so as to form correspondingly shaped penetration points P below the surface of the ground, as best seen in FIG. 2.

In the invention, the shaft 60 is of a spring-loaded construction so that it may be reciprocated downwardly under pressure and then resiliently returned to its original position. To this end, a resilient coiled compression spring may be disposed around the shaft 60 interiorly of the housing 50. The spring 70 bears at one end to a collar plate 72 affixed to the shaft 60 and against a bushing 74 mounted on the plate 56.

The shaft 60, in the form shown, extends through aligned apertures 76 and 78 in the body 16 so as to project beyond the under side 28 of the chamber 18. A cylindrical sleeve 80 is disposed in fluid sealing relation around the shaft 60 within the chamber 18 and provides a fluid sealed passageway for reciprocal movement of the shaft 60 therein. The shaft 60 may be provided with a sealing ring 82 which bears against the under side 28 of the chamber 18. By this arrangement, the shaft 60 may be reciprocated in a downward direction via the handle 62 for forcing the finger 66 of the agitator member 64 into penetrating engagement with the ground. Due to the resilient biasing characteristics of the spring 70, the agitator will automatically return to its upward and inoperative position upon release of pressure applied to the handle 62 such as by manual actuation thereof.

Figure 3:
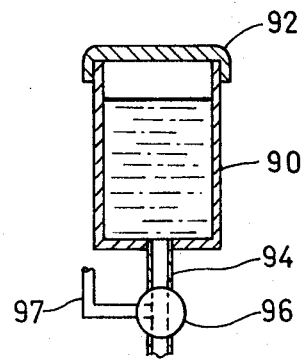
FIG. 3 is an enlarged section view of a portion of the dispensing mechanism taken along the line 3—3 of FIG. 1.

As best seen in FIGS. 1 and 3, the dispensing mechanism 12 may include a generally cylindrical vessel or container 90 attached, as at 91, to the housing 50. The container may include a removable cap 92 to facilitate filling the container to the desired level. The container 90 may be provided at its lower end with an outlet conduit 94 which extends through suitable apertures (not shown) in the body 16 so as to communicate at its lower end, as at 95, with the exterior of the body 16 adjacent the shaft 60. By this arrangement, the fluid and/or solid material in the container 90 may be fed, as by gravity, through the conduit 94 into the area of the work site and in close proximity to the impeller member 64 and into fluid diffusion relationship with the water delivered in the jet-like streams through the apertures 30 and 32 from the chamber 18. Moreover, the jet-like streams create a turbulent mixing action in the area immediately adjacent the agitator member 64 so as to mix and distribute the materials which are gravity delivered from the container 90.

In the invention, the container 90 may hold any fluid and/or solid chemical treating material. For example, the material may be formulated so as to have the ability to neutralize the deleterious material and/or the material may be formulated so as to provide a repellant to prevent the accumulation of such animal or pet droppings in the lawn or yard areas.

In the invention, the dispensing mechanism 12 may be selectively controlled by means of any suitable control valve (shown schematically at 96) disposed in fluid communication in the conduit 94. The valve 96 may be operated by an elongated lever 97 via a handle 98. The lever 97 may be attached to a drive arm 99 attached to the housing 50, as at 100. Moreover, by reciprocal actuation of the lever 97 via the handle 98 the valve 96 may be opened and closed in a manner known in the art for selectively controlling the gravity feed of fluid and/or solid materials from the container 90, as desired.

In the invention, though the agitator member 64 as been described as being of a fingered construction, it will be understood that other sizes and/or shapes may be employed such as in other cutters, mulchers, grinders and the like. In addition, it will be understood that the agitator member 64 is detachably connected to the shaft 60 so that other types of work implements such as brushes, scrubbers, polishers or the like may be quickly attached to the shaft 60 for performing other types of work operations, as desired. Furthermore, it will be understood that though the device of the invention has been described as being of a hand manipulated arrangement, it is contemplated that the device may be motor driven along the ground and that the agitator mechanism 14 can be motor driven for semi-automatic operation, as desired.

Figure 4:
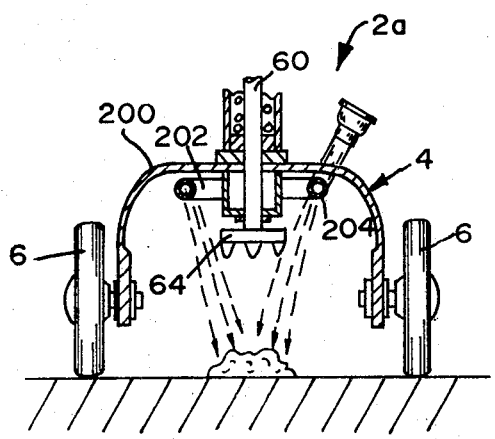
FIG. 4 is a generally vertical section view of a modified form of the multi-purpose utility device.

In FIG. 4 there is illustrated a modified form of the utility device, designated generally at 2a, which is generally similar to that shown in FIGS. 1 to 3, and wherein like reference characters refer to like parts thereof. In this form, in place of the fluid chamber 18 the frame 4 includes an inverted generally U-shaped housing or shell 200 supported via the wheels 6 and 7 for movement along the ground. The shell 200 acts as a deflection shield for a source of fluid under pressure directed toward the material to be removed. The fluid pressure source, in the form shown, is provided by an endless, such as circular ring 202 which may be mounted on the interior of the shell 200 and in generally concentric relation with respect to the shaft 60 and agitator 64 of the actuating mechanism 14. The ring 202 includes a series of peripherally spaced apertures 204 disposed on the underside thereof for directing fluid under pressure in jet-like streams down and onto the material to be removed for the purposes as aforesaid. By this arrangement, the agitator 64, for example, may be moved axially relative to the ring 202 toward and away from the ground and with the fluid under pressure (i.e. water or the like) directed downwardly into close proximity with the agitator 64 in the area adjacent the material to be removed. In this form, the ring 202 may be provided with a rotatable coupling 206 for attachment to a suitable fluid supply source, such as a garden hose or the like, as known in the art.

I claim:

1. A portable, multi-purpose utility device for fluid processing and mechanically working deleterious material disposed on the ground comprising,
    a frame,
    a set of wheels mounted on said frame for supporting said frame in spaced relation from the ground for movement along the ground to the location of the deleterious material on the ground,
    a handle mechanism mounted on the frame for grasping by an operator for manipulating the device for movement along the ground,
    a fluid dispensing chamber on said frame for delivering fluid material onto the deleterious material and the ground,
    said fluid dispensing chamber including a conduit system having a coupling assembly adapted for connection to a source of fluid material under pressure,
    a fluid control valve mounted on said frame and connected to said conduit system for controlling the flow of fluid material through said chamber,
    an agitator mechanism including a casing mounted on said frame,
    an actuating member extending through said casing and said frame having a lower end disposed in the space between said frame and the ground being adapted for mechanically working the ground and the deleterious material,
    said actuating member including a shaft mounted for reciprocating movement on the frame, said shaft being movable relative to said frame and to said ground while said frame remains in a substantially stationary relation with respect to said ground,
    said actuating member including an agitator member mounted adjacent said lower end of said shaft for mechanically working the ground to condition the ground for receiving the fluid material and the deleterious material,
    said shaft being movable in a generally vertical direction for moving said agitator member between a normally raised, non-actuated position above the ground to a lowered, actuated position for simultaneous engagement with the ground and the deleterious material,
    said fluid chamber including discharge openings spaced outwardly from and in surrounding relation with respect to said agitator member for spraying said fluid material under pressure directly from said chamber onto the deleterious material,
    a resilient compressible spring member mounted within said casing being connected at one end to said shaft and at its opposite end being biased by said frame for urging said agitator member into said raised position above the ground.
    said shaft including a handle portion for manually moving said shaft against the force of said spring for moving said agitator member from said normally raised position above the ground to said lowered position in engagement with the deleterious material and the ground,
    said fluid control valve being actuatable independently of said actuating member so as enable spraying of the fluid material in the raised or lowered position of the agitator member, and
    said agitator member including downwardly depending elements for penetrating the ground to enable the deleterious material to penetrate the ground upon fluidization thereof.

2. A multi-purpose utility device in accordance with claim 1, wherein
    said hollow body is formed integrally with said frame.

3. A multi-purpose utility device in accordance with claim 1, wherein
    said fluid dispensing chamber being defined by a hollow, generally circular ring supported by said frame in the space between said frame and the ground,
    said ring being disposed in generally concentric relation with respect to the central longitudinal axis of said shaft,
    said discharge openings comprising a series of peripherally spaced apertures adjacent the underside of said ring for directing said fluid material downwardly onto the deleterious material and the ground.

4. A multi-purpose utility device in accordance with claim 1 including
    chemical treating means comprising a container connected in fluid communication with said chamber for holding chemical treating material and selectively delivering said chemical material into said chamber to diffuse said chemical treating materials with said fluid material in said chamber for discharging the fluid material through said discharge openings onto the ground.

5. A multi-purpose utility device in accordance with claim 4 wherein
    said container is mounted above said chamber, and
    another control valve is operably associated with said container for selectively controlling the flow of said chemical treating materials from said container into said chamber.

6. A multi-purpose utility device in accordance with claim 1 wherein
said frame is of an inverted generally U-shaped configuration in vertical section defining a cavity opening in a direction toward the ground, and
said agitator member is disposed within said cavity to enable movement thereof between said frame and the ground.

* * * * *